US006492642B1

(12) United States Patent
Belanov et al.

(10) Patent No.: US 6,492,642 B1
(45) Date of Patent: Dec. 10, 2002

(54) METHOD FOR IDENTIFYING RADIONUCLIDES IN PROBES USING A LIQUID SCINTILLATION SENSOR

(75) Inventors: Sergei Vladimirovich Belanov, Moscow; Igor Anatolievich Kashirin, Moskovskaya oblast; Sergei Vladimirovich Malinovsky, Troitsk; Andrei Igorevich Sobolev, Moscow; Viktor Alexandrovich Tikhomirov, Moscow; Konstantin Mikhailovich Efimov, Moscow; Alexandr Ivanovich Ermakov, Moscow; Maria Evgenievna Egorova, Moscow, all of (RU)

(73) Assignee: Moskovskoe Gosudarstvennoe Predpriyatie-Obiedinenny Ekologo-Tekhnologichesky I Nauchno-Issledovatelsky Tsentr Po Obezvrezhivaniju Radioaktivnykh Otkhodov I Okhrane Okruzhajuschei Sredy (Mosnpo "Radon", Moscow (RU)

( * ) Notice: Subject to any disclaimer, the term of this patent is extended or adjusted under 35 U.S.C. 154(b) by 0 days.

(21) Appl. No.: 09/581,006

(22) PCT Filed: Nov. 12, 1998

(86) PCT No.: PCT/RU98/00372

§ 371 (c)(1),
(2), (4) Date: Jun. 7, 2000

(87) PCT Pub. No.: WO99/30185

PCT Pub. Date: Jun. 17, 1999

(30) Foreign Application Priority Data

Dec. 8, 1997 (RU) .......................... 97121316
Apr. 3, 1998 (RU) .......................... 98106407

(51) Int. Cl.[7] .............................. G01T 1/204
(52) U.S. Cl. .................. 250/364; 250/362; 250/328
(58) Field of Search ................. 250/362, 364, 250/328, 369; 436/57

(56) References Cited

U.S. PATENT DOCUMENTS 4,742,226 A  *  5/1988  De Filippis ............... 250/328
4,956,559 A  *  9/1990  Shiraishi ................. 250/484.1
5,134,294 A  *  7/1992  Rjundt et al. ............. 250/364
5,412,216 A     5/1995  Dodson, Jr. .............. 250/364

FOREIGN PATENT DOCUMENTS

| EP | 0221626 A1 | 5/1997 | |
|---|---|---|---|
| GB | 1145713 A | 3/1969 | |
| RU | 807807 A | 6/1983 | |
| WO | WO 91/10922 | * 7/1991 | ................. 250/364 |

OTHER PUBLICATIONS

International Search Report for International Application No. PCT/RU98/00372, mailed Apr. 7, 1999.

* cited by examiner

Primary Examiner—Constantine Hannaher
Assistant Examiner—Albert Gagliardi
(74) Attorney, Agent, or Firm—Banner & Witcoff, Ltd.

(57) ABSTRACT

The invention relates to the field of radio-ecological monitoring, in particular to a method for measuring the content of radionuclides in components of the environment. The technical result is enhancement of the sensitivity of liquid scintillation analysis of radionuclides with low activity in the presence of radionuclides with high activity. Selection and preparation of a sample for measurements are carried out, the spectrum of the sample is measured and recorded, the measured spectrum $P_i$ is grouped, model spectrum $M_i = \Sigma c_j M_{ij}$, wherein $c_j$ designates relative contributions of base spectra of radionuclides in the model spectrum, is created on the basis of a library of base spectra of radionuclides $M_{ij}$, where i is the No. of the group, j is the index of the radionuclide, and the content of the radionuclides in the sample is determined, minimizing the deviation of the model spectrum $M_i$ from the measured spectrum $P_i$ in accordance with the expression $$\sum_i \left( \frac{P_i - M_i}{\min(P_i, M_i) + \delta} \right)^2 \to \min,$$

where $\delta$ is a coefficient determining stability of the minimization process.

8 Claims, 6 Drawing Sheets

METHOD FOR IDENTIFYING RADIONUCLIDES IN PROBES USING A LIQUID SCINTILLATION SENSOR

FIELD OF THE INVENTION

The invention relates to the field of radio-ecological monitoring and may be used to measure the content of radionuclides in different components of the environment, during the processing of results of measurement in a hardware-software complex, making it possible to deal with large masses of radio-ecological information. Furthermore, the invention may be used in the accumulation, storage, renewal and transmission of radio-ecological data with subsequent mathematical processing with the use of computer display of the results on an electronic cartographic base. More concretely, the claimed method may be used to determine the activity of beta/alpha radiating radionuclides, such as H-3, C-14, Co-60, Ni-63, Sr-90, Cs-137, U-236, Pu-239, Am-241 and others, in prepared liquid samples by processing apparatus spectra with the use of a liquid scintillation counter.

PRIOR ART

A method for measuring the activity of samples comprising several radionuclides with the use of a liquid scintillation counter is known (see U.S. Pat. No. 4,918,310, IPC G 01 T 1/204). For the presumed N radionuclides at least N+1 windows of a pulse height analyzer are selected and the number of pulses in each window is counted. Then for the presumed quench level, earlier obtained efficiencies of registration of separate radionuclides are selected for each window and N+1 equations are made, from which the true values of the activities of separate radionuclides are determined by the method of least squares. Then another quench level is selected, and the values of activity are calculated for it. This cycle is repeated until the minimum deviation of the sum of these activities from the measured activity is reached.

A method is known in which the spectrum of the sample being assayed is measured by means of a multichannel amplitude analyzer which is connected to an analog-to-digital converter. Its quench level is determined, the normalized spectra of separate radionuclides are calculated for this quench level, and, using the method of least squares, it is determined by which multipliers should the spectra of separate samples be multiplied in order to obtain a sum spectrum that is closest to the one being assayed, wherein the aforesaid multipliers are proportional to the true content of the radionuclides in the sample (see U.S. Pat. No. 5,134,294, IPC G 01 T 1/204).

The method which is most similar to the claimed method in respect to technical essence and achieved effect is the method for identifying radionuclides in a liquid scintillation sample (see PCT application No. PCT/FI90/00016, IPC G 01 T 1/204), in which the spectrum of the sample being assayed is measured, after which for a corresponding quench level, normalized model spectra of separate radionuclides are determined from a library of base spectra of separate radionuclides for different quench levels by the method of interpolation and extrapolation. Then the method of least squares is used to minimize the difference between the spectrum of a sample $P_i$ and the sum of model spectra of separate radionuclides $M_{ij}$, multiplied by the coefficients $c_j$ determining the activity of separate radionuclides. The expression being minimized is as follows:

$$F = \sum_i \left( P_i - \sum_j c_j M_{ij} \right)^2 = \min \quad (1)$$

where i is the No. of the analyzer channel, j is the index of a radionuclide.

However, the known methods do not make it possible to identify radionuclides that have low activity when there are radionuclides with high activity present in the sample. This is due to the fact that because of the static character of the value of $P_i$, the square of deviation of each addend in the sum (1) has a static spread of values of about $\sim P_i$. Accordingly, during minimization, only the addend with a large value of the analyzer count of $P_i$ will affect the expression F being minimized, while the addend with the small value of $P_i$ will be "absorbed" because of the aforesaid spread. This results in that identification of the radionuclides is carried out almost only according to the "peaks" of the spectra, without taking into account the additional information which may be provided by the weakly active sections.

Furthermore, the known methods do not make it possible to identify alpha-active radionuclides on a liquid scintillation counter. This is due to the fact that the alpha spectra of different radioisotopes when measured on a liquid scintillation counter have spectra which are very close in shape and almost completely overlap. The spectrum of a sample, which consists of several alpha-active nuclides, in shape hardly differs at all from the spectrum of a separate radionuclide, in view of which existing methods are not capable of distinguishing the contributions of different alpha-emitters. This results in that existing methods are only used for monitoring the presence of alpha-active radionuclides, without determining the radioisotope makeup.

SUMMARY OF THE INVENTION

The object of the invention is to create a method for identifying radionuclides in samples, which ensures enhancement of the sensitivity of liquid scintillation analysis to radionuclides having low activity, where there are radionuclides having high activity in the samples.

Furthermore, an object of the invention is to create a method for identifying radionuclides in samples, which ensures an increase in the reliability of measurement and the possibility for carrying out liquid scintillation analysis of alpha-emitting radionuclides in the case where there are interfering radionuclides in the samples.

The indicated technical result is achieved in a method for identifying radionuclides in samples with the use of a liquid scintillation counter, the method comprising selecting a sample of the environment or a technological sample, preparing the sample for measurement on a liquid scintillation counter, measuring and recording the spectrum of the sample, grouping the measured spectrum of the sample, creating a model spectrum on the basis of a library of base spectra of radionuclides and determining the content of the radionuclides in the sample by minimizing the deviation of the model spectrum from the measured spectrum of the sample, in that in accordance with the invention, determination of the content of radionuclides in the sample is carried out, minimizing the deviation of the model spectrum from the measured spectrum of the sample according to the expression $$\sum_i \left( \frac{P_i - M_i}{\min(P_i, M_i) + \delta} \right)^2 \to \min,$$

where $P_i$ is the measured spectrum of the sample,

δ is a coefficient, on the value of which the stability of the minimization process depends (δ>0), $$M_i = \sum_j c_j M_{ij}$$

is a model spectrum, i is the number of a group, j is the index of a radionuclide, $M_{ij}$ are normalized spectra of separate radionuclides from the library of base spectra, $c_j$ designates relative contributions of base spectra of radionuclides to a model spectrum, by varying the values of these contributions $c_j$, after which the obtained values of relative contributions of base spectra of radionuclides $c_j$ are recalculated into values of absolute activities ($A_j$) of radionuclides in a sample according to the equation:

$A_j = c_j * P/E_j$,
where $$P = \sum_i P_i$$

is the integral count of the sample, $E_j$ is the efficiency of registration for the j isotope.

Wherein when the measured spectrum of the sample is grouped, the boundary values of the groups $N_i$ are preferably determined in accordance with the recurrent relationship:

$N_{i+1} = N_i + [(i+1)/m]$, where i=1, 2, . . . , n, n is the number of groups, m is an integer depending on the number of channels of the amplitude analyzer of the liquid scintillation counter and on the necessary number of groups,

[(i+1)/m] is a sign for an integer part of the expression.

Wherein, it is preferable that minimization of the deviation of a model spectrum from the measured spectrum of a sample be carried out in several steps. Wherein, in the initial step a value of δ not less than max ($P_i$, $M_i$) for any i, and zero values of relative contributions of base spectra of radionuclides to the model spectrum ($c_j$) are selected. Varying the value of $c_j$, the minimum is found, and at each following step δ is reduced, repeating the process of minimization, wherein the results of calculation obtained at the preceding step are the initial meanings of the contributions $c_j$ for each following step of minimization.

Furthermore, it is preferable that determination of the content of radionuclides in a sample with use of step-by-step minimization of the deviation of a model spectrum from the measured spectrum of a sample be terminated when the process of minimization becomes unstable, i.e. when small changes in the meanings of relative contributions of base spectra of radionuclides in the model spectrum $c_j$ will result in a substantial change in the expression being minimized.

It is also preferable that in the case of a solid sample, when it is being prepared for measurement on a liquid scintillation counter, in order to reduce the effects of luminescence and quenching, annealing of the sample is carried out, acidic breaking up is carried out with the aid of concentrated nitric acid and hydrogen peroxide, the sample is concentrated by evaporation to a state of moist salts, the moist residue is converted into a hydrochloride solution by adding a hot solution of hydrochloric acid and is concentrated by evaporation with the periodic addition, at least twice, of distilled water, then, after cooling to room temperature, concentrated orthophosphoric acid is added to the obtained concentrated solution, it is concentrated by evaporation with the periodic addition, at least twice, of concentrated hydrogen peroxide and hot distilled water to the formation of a colorless viscous solution which is a mixture of pyrophosphate complexes of cations of the main components of the solid sample, the solution is cooled to room temperature, a saturated solution of a bivalent lead chloride is added thereto and carried into a scintillation cocktail, adding an emulsifier, and the mixture is thoroughly mixed, obtaining a countable sample prepared for spectrometric analysis.

BRIEF DESCRIPTION OF THE DRAWINGS

The invention is explained by examples of its embodiment, illustrated by drawings on which the following is presented.

EMBODIMENTS OF THE INVENTION

Figure 1:
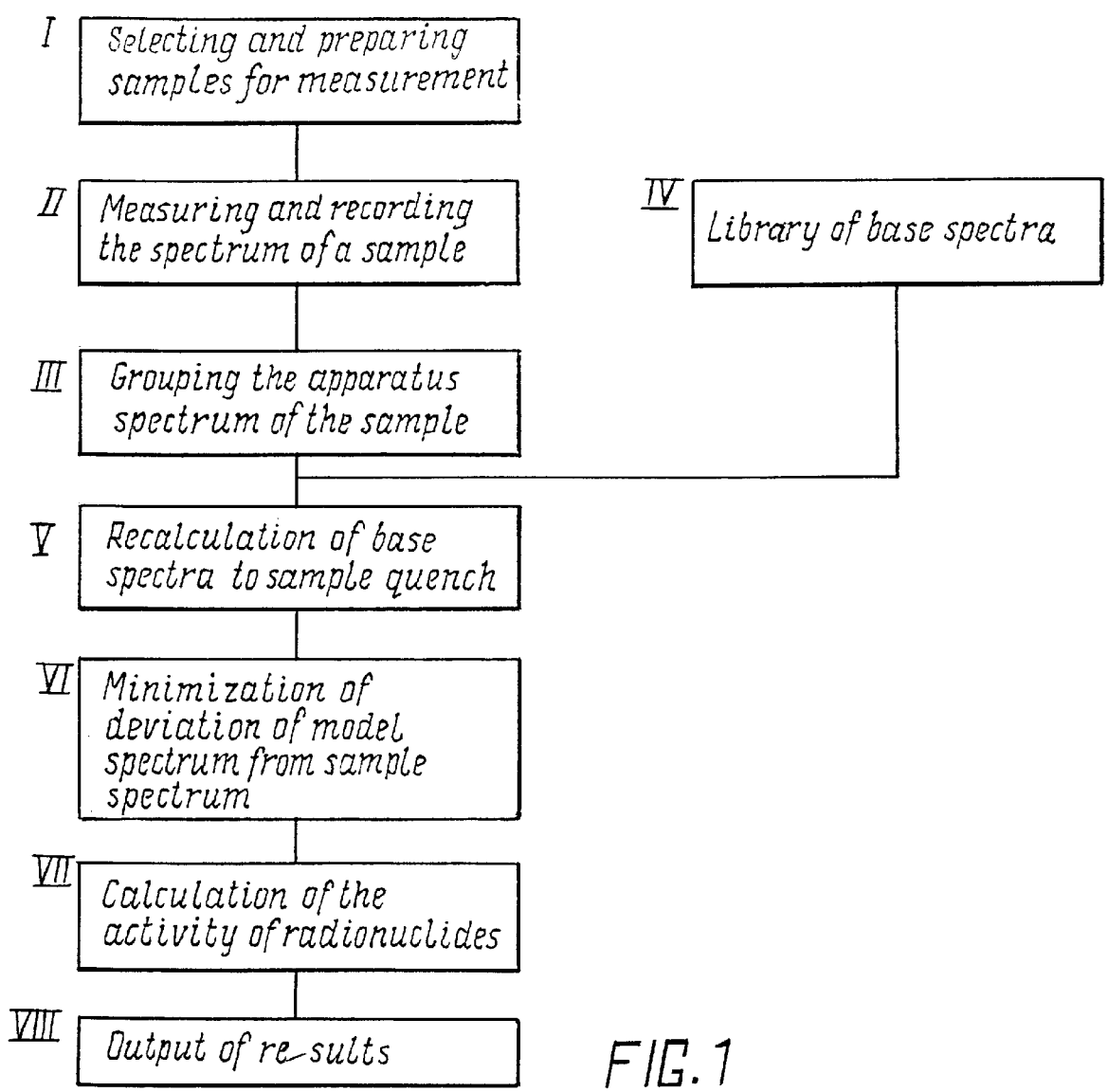
FIG. 1 shows a block diagram of realization of the method for identifying alpha-radionuclides in samples with use of a liquid scintillation counter.

The method is carried out in the following manner in accordance with the block diagram shown in FIG. 1.

I. Selection and Preparation of Samples for Measurement

A spectrometric analysis based on liquid scintillation count may be carried out for any samples (environment and technological) after their according preparation. As a rule, these are aqueous samples, solid samples (earth, soil, residue, et al), samples of vegetation (wood and grass) and air samples. The selection of technological samples and environment samples is carried out according to standard methods.

Preparation of Aqueous Samples

Where the presumed volumetric activity of a radionuclide in a sample is more than $10^2$ Bk/l, the sample is not concentrated, but is analyzed right away. In order to do this aliquots with a volume of not more than 10 ml are selected from each of three parallel samples, the pH of the solution is checked and if necessary it is brought to a neutral value (with concentrated hydrochloric acid or concentrated ammonia), then the neutral solutions are put in flasks for liquid scintillation count, the flasks being preliminarily filled with 10 ml of a scintillation cocktail. The contents of each flask are mixed to obtain a homogeneous solution, the flasks are held in darkness for at least 12 hours (to quench possible chemical luminescence and photoluminescense processes) and measured. Simultaneously with the sample to be analyzed, a background sample is similarly prepared, wherein the same volume of deionized water is introduced as in the prepared sample, but not more than 10 ml.

Samples with a low volumetric activity of radionuclides ($<10^2$ Bk/l) prior to analysis are concentrated by evaporation from a volume of 1–2 l. Some of the radionuclides may be lost during the concentration of the samples by evaporation, for example C-14, S-35, which are in the water in the form of dissolved gases or volatile organic compounds. Therefore, their presence and amount should be assayed with a liquid scintillation analyzer by measuring 10 ml of a sample which has not been concentrated.

Preparation of Solid Samples

The preparation of solid samples is carried out using acid decomposition or microwave technology.

Preparation of Solid Samples by Acid Decomposition

During the preparation of a solid sample and its mixture with a liquid scintillator for measurement with the aid of liquid scintillation count (LSC), interfering processes occur, such as quenching and luminescence. These processes are manifested by a reduction of the number of light pulses registered by photoelectric multipliers (PEM), by a change in the shape and amplitude of a radionuclide spectrum with a simultaneous shift of the spectrum to the low-energy region. As a result, the probability of correct identification of the radionuclide and the efficiency of registering its radiation with a PEM are substantially reduced.

During the preparation of solid samples in the claimed method, the developed method of preparing a count sample is carried out, the method ensuring enhancement of the reliability of the measurement of the radioactivity of these samples as a result of increasing the weight of the count sample which is directed for spectrometric analysis.

The smallest (<0.5 mm) fraction of the sample is taken for analysis.

Before the sample is broken up, it is annealed against possibly present organic impurities which may cause additional coloring of the prepared sample and serve as a reason for optical quenching. A possible loss of cesium and iodine isotopes is preliminarily assayed by gamma-spectrometry of the unannealed sample. After annealing, a 3–5 g specimen of the sample is taken and its acidic breaking up is carried out using concentrated nitric acid $HNO_3$ and concentrated hydrogen peroxide $H_2O_2$. An acidic infusion is concentrated by evaporation to a state of moist salts.

The following steps are carried out during the preparation of a sample for liquid scintillation count with minimization of undesirable processes of chemical and optical quenching and chemical luminescence:

In order to reduce the degree of chemical quenching, the nitric acid solution is converted to a hydrochloric acid solution by adding a hot solution of hydrochloric acid and concentrating by evaporation to a minimum volume (2–3 ml) with the periodic addition of distilled water at least two times. As a rule, depending on the makeup of the sample and the content of iron therein, the concentrated solution has an intensive yellow or red-brown coloring.

In order to reduce the degree of optical quenching of the solution, the chlorides composing it are converted into pyrophosphate complexes, which for the majority of cations—components of solid samples, in particular soil (Al3+, Ca2+, Fe3+, Mg2+) are colorless and have a high stability constant.

To do this, a concentrated orthophosphoric acid is entered into a cooled hydrochloric acid solution, while being mixed. In order to produce pyrophosphoric acid ($H_4P_2O_7$) according to the reaction:

$$2H_3PO_4 \rightarrow H_4P_2O_7 + H_2O,$$

the hydrochloric acid solution with the added $H_3PO_4$ is heated to a temperature $\geq 200°$ C.

During the heating and evaporation the hydrochloric acid is removed, the $H_3PO_4$ solution is gradually concentrated and pyrophosphoric acid is produced, with which the metal cations in turn react to form stable pyrophosphate complexes. The solution is evaporated to the production of a viscous mass. During the process of evaporation, small portions (5–10 ml) of hot distilled water and 300–500 µl drops of 30% $H_2O_2$ are added to a boiling solution of this mass 2–3 times.

Wherewith the solution loses it coloring as a result of the formation of uncolored pyrophosphate complexes. Evaporation is carried out to a volume of not less than 1.5–2 ml, since lesser volumes during cooling result in vitrification of the obtained viscous liquid. Then the solution is cooled to a temperature of about 30° C. and, if necessary (if the vitrification process has started), 1 ml of hot distilled water is added, and the solution is thoroughly mixed to a homogeneous (in respect to consistency) mass.

In order to suppress the processes of chemical luminescence as a result of the formed peroxide and superoxide compounds of phosphorus, 1 ml of a saturated, freshly prepared solution of a bivalent lead chloride is added to the solution while mixing.

In order to prepare a count sample, the obtained solution is put in a measuring flask for the LSC, preliminarily filled with 10 ml of a scintillation cocktail, and 1 ml of a concentrated solution of an emulsifier is added, which enhances the emulsifying capability of the scintillation cocktail and the solubility of salts therein.

In order to suppress photoluminescence, the sample thus prepared is held at least 12 hours in a darkened place and then measured on a liquid scintillation counter.

Preparation of Solid Samples with the Aid of Microwave Technology

A finely divided fraction of a quartered sample is ground in a planetary microgrinder to a size of 0.1 mm and less, a specimen of 5–10 g is taken and carried into fluoroplastic sleeves of the rotor of a microwave oven. Ten ml of a mixture of concentrated nitric acid and 30% hydrogen peroxide in a volumetric ratio of 9:1 are also introduced into each of the sleeves. The sleeves are closed with special covers with relief valves, placed in the rotor and arranged in the oven. The process of decomposing the sample is carried out in the following modes: 5 min at 250 W of pulse microwave radiation, 10 min at 400 W and 5 min at 500 W. Due to the uniform microwave heating of the sample in the closed space in a reaction medium, a high temperature and a high pressure are created which make it possible to reduce the time for breaking up the sample by ten times and to promote its complete decomposition in the majority of cases.

After the process has finished and the sample has cooled, it is filtered (in the case of incomplete decomposition), the residue on the filter is washed 2 times with 5 ml of 5 M nitric acid, the acidic fractions are joined and prepared for the liquid scintillation count as earlier described.

Preparation of Vegetation Samples

Vegetation samples are dried for 6–8 hours at a temperature of 60° C. in a drying cabinet. The dried samples are ground using a grinder, weighed, placed in porcelain crucibles with lids and ashed in a muffle furnace for 6–7 hours at 400–450° C. After ashing has been completed, acidic leaching and preparation for liquid scintillation count are carried out as described above in respect to soil samples.

Preparation of Air Samples

Filters consisting of Petryanov tissue are cut up with scissors, placed in porcelain crucibles with lids and ashed in a muffle furnace for several hours at 400–450° C. After ashing has been completed, acidic leaching and preparation for liquid scintillation count are carried out as described above in respect to soil samples.

Preparation of Background Samples

During an analysis of water, soil, vegetation and air samples, samples prepared by mixing 10 ml of a scintillation cocktail with a volume of hydrochloric acid (or a mixture thereof with a solution of lead chloride), equal to the volume of the sample prepared and introduced into the measuring flask, in flasks for liquid scintillation count (with a volume of 20 ml), are used as the background samples.

Preparation of Background Samples

During an analysis of soil, vegetation and air samples, samples prepared by mixing 10 ml of a scintillation cocktail with a volume of hydrochloric acid (or a mixture thereof with a solution of lead chloride), equal to the volume of the sample prepared and introduced into the measuring flask, in flasks for liquid scintillation count (with a volume of 20 ml), are used as the background samples.

II. Measuring and Recording the Spectrum of a Sample

The following operations are carried out during the measurement of the spectrum of a sample:

A background sample and those prepared for analysis are placed in a special holder. The holder is placed in an analyzer. A clip with a code corresponding to the program of measurement of the sample in the mode for counting the registered pulses per min is inserted in the left-hand side of the holder. The time of measurement and the energetic range of from 0 to 2000 kiloelectron volts are set in the program of measurement. After that the analyzer is switched to the count mode in which all of the flasks in the holder that contain the samples are automatically counted. All of the parameters set in the program are recorded, in particular: sample index, time of measurement, count, error, quench parameter, and the obtained spectrum of the sample is maintained in the form of a file with distribution of the number of registered pulses to energetic channels of the multichannel analyzer. After that the obtained energetic spectrum of the sample is analyzed in accordance with a specially developed program and the qualitative makeup of the sample and the volumetric (specific) activity of its components are determined.

III. Grouping the Apparatus Spectrum of the Sample

Grouping the apparatus spectrum of the sample is used in this method, the boundary values of $N_i$ in the groups being determined in accordance with the recurrent relationship:

$$N_{i+1} = N_i + [(i+1)/m], \quad (2)$$

where i=1, 2, ... m n, n is the number of groups, m is an integer depending on the number of channels of the amplitude analyzer of the liquid scintillation counter and on the necessary number of groups,

[ ] is a designation for an integer part of the expression.

The boundary values for 90 groups, determined in accordance with expression (2) with m=2, are presented in Table 1. This corresponds to 2115 channels of the analyzer. The number of groups and the value of m are selected depending on the number of channels of the amplitude analyzer used and the detailedness of the apparatus spectrum.

TABLE 1

| Group No. | Boundaries of group |
|---|---|
| 1 | 1 |
| 2 | 2–3 |
| 3 | 4–5 |
| 4 | 6–8 |
| 5 | 9–11 |
| 6 | 12–15 |
| 7 | 16–19 |
| 8 | 20–24 |
| 9 | 25–29 |
| 10 | 30–35 |
| 11 | 36–41 |
| 12 | 42–48 |
| 13 | 49–55 |
| 14 | 56–63 |
| 15 | 64–71 |
| 16 | 72–80 |
| 17 | 81–89 |
| 18 | 90–99 |
| 19 | 100–109 |
| 20 | 110–120 |
| 21 | 121–131 |
| 22 | 132–143 |
| 23 | 144–155 |
| 24 | 156–168 |
| 25 | 169–181 |
| 26 | 182–195 |
| 27 | 196–209 |
| 28 | 210–224 |
| 29 | 225–239 |
| 30 | 240–255 |
| 31 | 256–271 |
| 32 | 272–288 |
| 33 | 289–305 |
| 34 | 306–323 |
| 35 | 324–341 |
| 36 | 342–360 |
| 37 | 361–379 |
| 38 | 380–399 |
| 39 | 400–419 |
| 40 | 420–440 |
| 41 | 441–461 |
| 42 | 462–483 |
| 43 | 484–505 |
| 44 | 506–528 |
| 45 | 529–551 |
| 46 | 552–575 |
| 47 | 576–599 |
| 48 | 600–624 |
| 49 | 625–649 |
| 50 | 650–675 |
| 51 | 676–701 |
| 52 | 702–728 |
| 53 | 729–755 |
| 54 | 756–783 |
| 55 | 784–811 |
| 56 | 812–840 |
| 57 | 841–869 |
| 58 | 870–899 |
| 59 | 900–929 |
| 60 | 930–960 |
| 61 | 961–991 |
| 62 | 992–1023 |
| 63 | 1024–1055 |
| 64 | 1056–1088 |
| 65 | 1089–1121 |
| 66 | 1122–1155 |
| 67 | 1156–1189 |

TABLE 1-continued

| Group No. | Boundaries of group |
|---|---|
| 68 | 1190–1224 |
| 69 | 1225–1259 |
| 70 | 1260–1295 |
| 71 | 1296–1331 |
| 72 | 1332–1368 |
| 73 | 1369–1405 |
| 74 | 1406–1443 |
| 75 | 1444–1481 |
| 76 | 1482–1520 |
| 77 | 1521–1559 |
| 78 | 1560–1599 |
| 79 | 1600–1639 |
| 80 | 1640–1680 |
| 81 | 1681–1721 |
| 82 | 1722–1763 |
| 83 | 1764–1805 |
| 84 | 1806–1848 |
| 85 | 1849–1891 |
| 86 | 1892–1935 |
| 87 | 1936–1979 |
| 88 | 1980–2024 |
| 89 | 2025–2069 |
| 90 | 2070–2115 |

Figure 2:
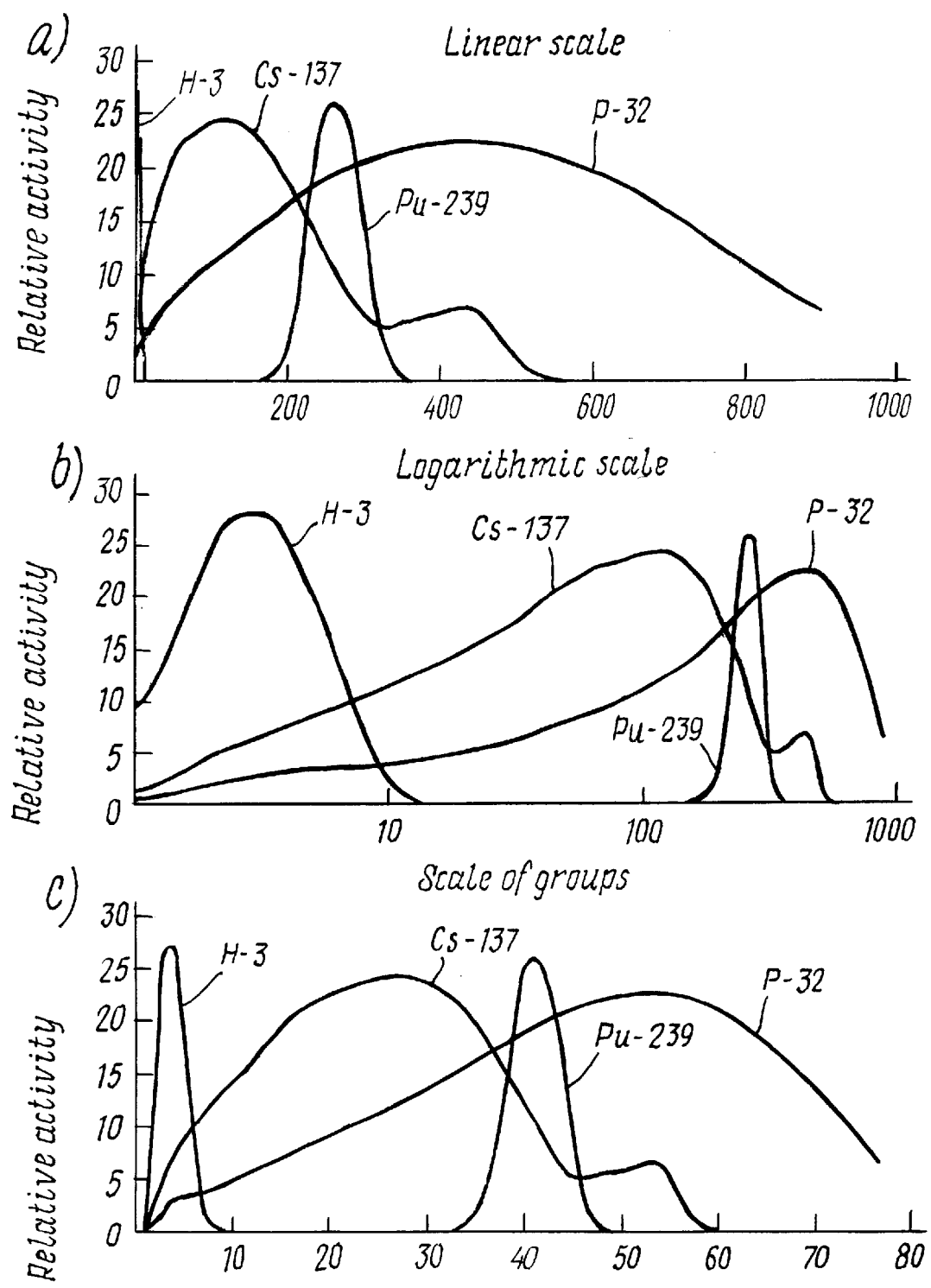
FIG. 2 shows the spectra of some radionuclides in different scales.

The graphs of beta spectra of some radionuclides in a linear scale are shown in FIG. 2a. It is evident from the graph that "soft" spectra (in this case the spectrum of tritium—H-3) in practice coincide with the origin and when grouped become one, which, naturally, does not make it possible to assay their shape.

The use of logarithmic breakdown (FIG. 2b) is not possible either, since the low-energy portion of the spectra in that case is stretched over a large part of the range, compressing the high-energy portion of the spectra in the last groups, which also results in a loss of information.

Grouping the apparatus spectrum in accordance with the invention as provided by expression (2) makes it possible to comprehensively, without loss of information, to separate the spectra of low-energy radionuclides (FIG. 2c). Wherein, upon movement to the high-energy regions, the difference in the width of the groups is leveled, as a result of which the detailedness of presentation of the high energy region in the proposed scale of the groups becomes the same as in the case of a linear scale.

IV. Creation of a Library of Base Spectra

Figure 3:
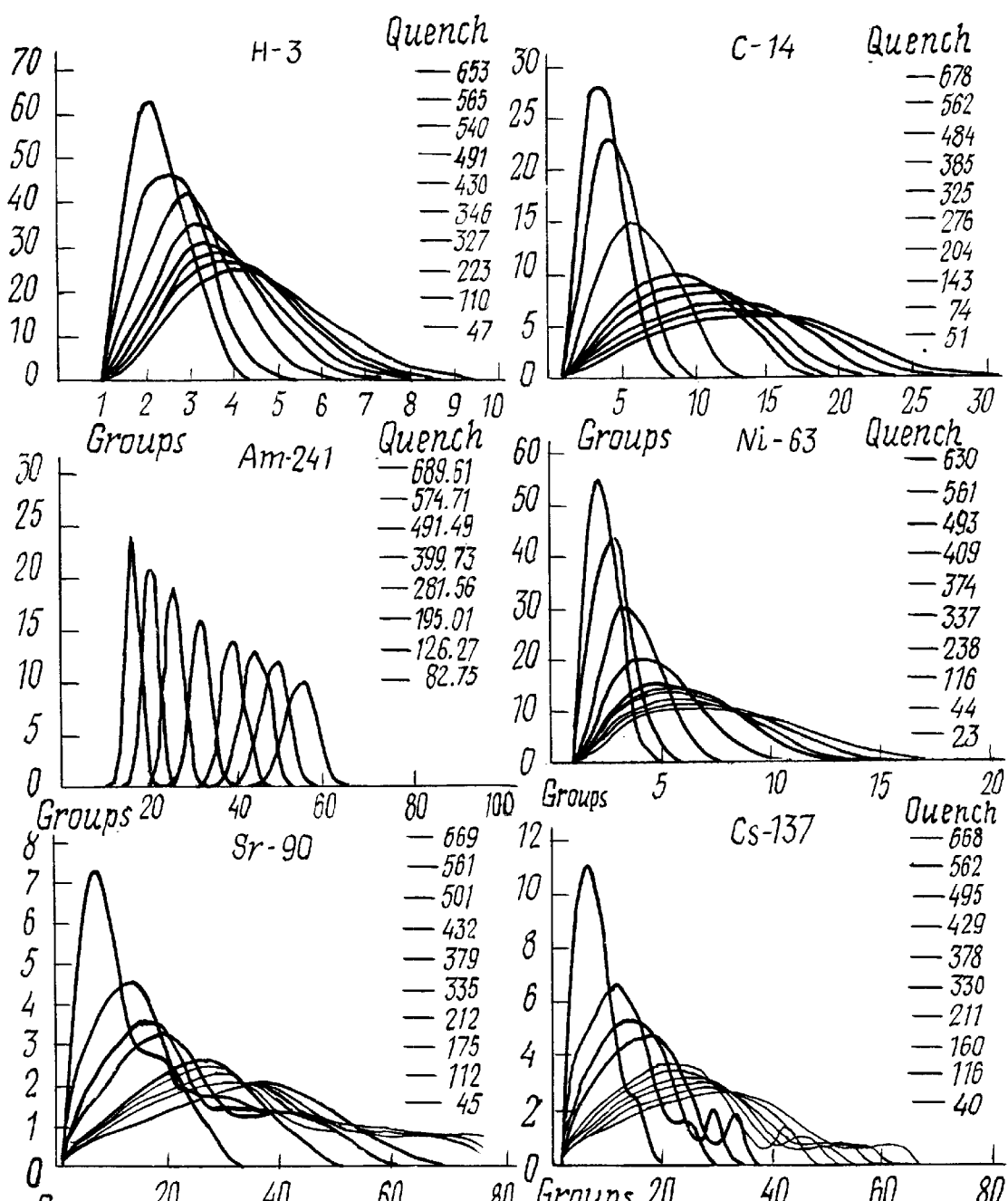
FIG. 3 shows a fragment of a library of base spectra.

The following is carried out in order to create a library of base spectra. A series of at least 10 flasks with a known identical amount of radioactive labels is prepared for each of the control sources. An increasing amount of a chemical quencher is put into each of the flasks, beginning with the second. After that the whole series is counted on a liquid scintillation analyzer with a record of all of the spectra made in the nuclide library, wherein a certain efficiency of registration of radionuclide radiation corresponds to each value of the quench parameter. The energetic spectra of some radionuclides with different chemical quench are presented in FIG. 3. With intensification of the quench effect in the sample (the quench value whereby is reduced), the spectral curve being registered by the analyzer is positioned in the region of lower energy, wherein the efficiency of registration may substantially decrease.

The spectra of separate radionuclides for different quenches, recalculated into groups, are introduced into the library.

The values of the efficiency of registration for each quench are also included in the library.

All of the library spectra are normalized to a unit activity.

The obtained library of spectra of the most widespread nuclides and of quenching curves makes it possible to analyze the real samples in a wide quench range for a given type of scintillation cocktail.

V. Recalculation of Base Spectra to Sample Quench

The base spectra for a final set of quenches are provided in the library. The quenches of the sample being studied may not coincide with the quench values for the library spectra. Therefore when processing a sample with a predetermined quench, the base spectra are brought to that quench by interpolating between library spectra. The efficiency of registration for each radionuclide is also interpolated to this quench. The obtained spectra are normalized and used further when a model spectrum is created.

VI. Minimization of Deviation of Model Spectrum from Sample Spectrum

During the next step a model spectrum is created:

$$M_i = \sum_j c_j M_{ij} \tag{3}$$

where $M_{ij}$ are model spectra of separate radionuclides, $c_j$ designates relative contributions to the model spectrum of those radionuclides, i is the group No., j is the index of the radionuclide.

In order to find the contributions $c_j$, the difference between the model spectrum and the spectrum of sample $P_i$ is minimized.

When solving the problem of minimization, the most important moment is the correct selection of the minimization criterion.

Use of minimization of the absolute deviation of the sample spectrum from the model spectrum (see equation [1]), as is done in the prototype, does not make it possible to distinguish low activities on a background of high activities.

In order to distinguish radionuclides with low activity in the samples on a background of radionuclides with high activity, the following expression should be minimized:

$$\sum_i \left(\frac{P_i - M_i}{\min(P_i, M_i) + \delta}\right)^2 \to \min, \tag{4}$$

where $P_i$ is the spectrum of the sample, $\delta$ is the coefficient of stability of the minimization process.

Here division by min $(P_i, M_i)$ (transition to relative deviation), and not just by $P_i$, is used to increase the sensitivity to "low-active" regions of the spectrum, since this makes it possible to even more increase the role played by the components with small values of $M_i$.

The coefficient of stability $\delta$ is a small additive which is necessary to prevent division by zero with min $(P_i, M_i)=0$ and to prevent instability of the expression (4) because of the components in which the component min $(P_i, M_i)$ is less than the static spread of the values $P_i$.

The selection of the coefficient $\delta$ simultaneously affects the stability of the expression (the greater $\delta$, the higher the stability), and the sensitivity of the method in respect to low-active elements (the greater $\delta$, the lower the sensitivity).

In the extreme variant, with $\delta \to \infty$, the expression being minimized comes down to the form of (1), used in the prototype. During the calculation, at first a large value of the coefficient $\delta$ is selected, the minimum of the expression (4) is determined, after which $\delta$ is reduced and the minimization process is repeated. Wherein, the results of the preceding step are the initial values of the contributions $c_j$ for each subsequent step. The calculation is stopped when the process of minimization of the expression (4) becomes unstable, i.e. when small changes in the values of relative contributions of the base spectra of radionuclides to the model spectrum $c_j$ result in a substantial change of the expression being minimized.

VII. Calculation of the Activity of Radionuclides

The obtained values of $c_j$ determine the relative contribution of radionuclides to the activity of the sample. A transition to absolute activity is carried out according to the equation:

$$A_j = c_j * P/E_j \quad (5),$$

where $$P = \sum_i P_i$$

is the integral count of the sample, $E_j$ is the efficiency of registration.

Thus, as a result of measuring and processing the spectrum of the sample, the radionuclide makeup has been identified and the activity of each radionuclide in the makeup of the sample obtained.

Figure 4:
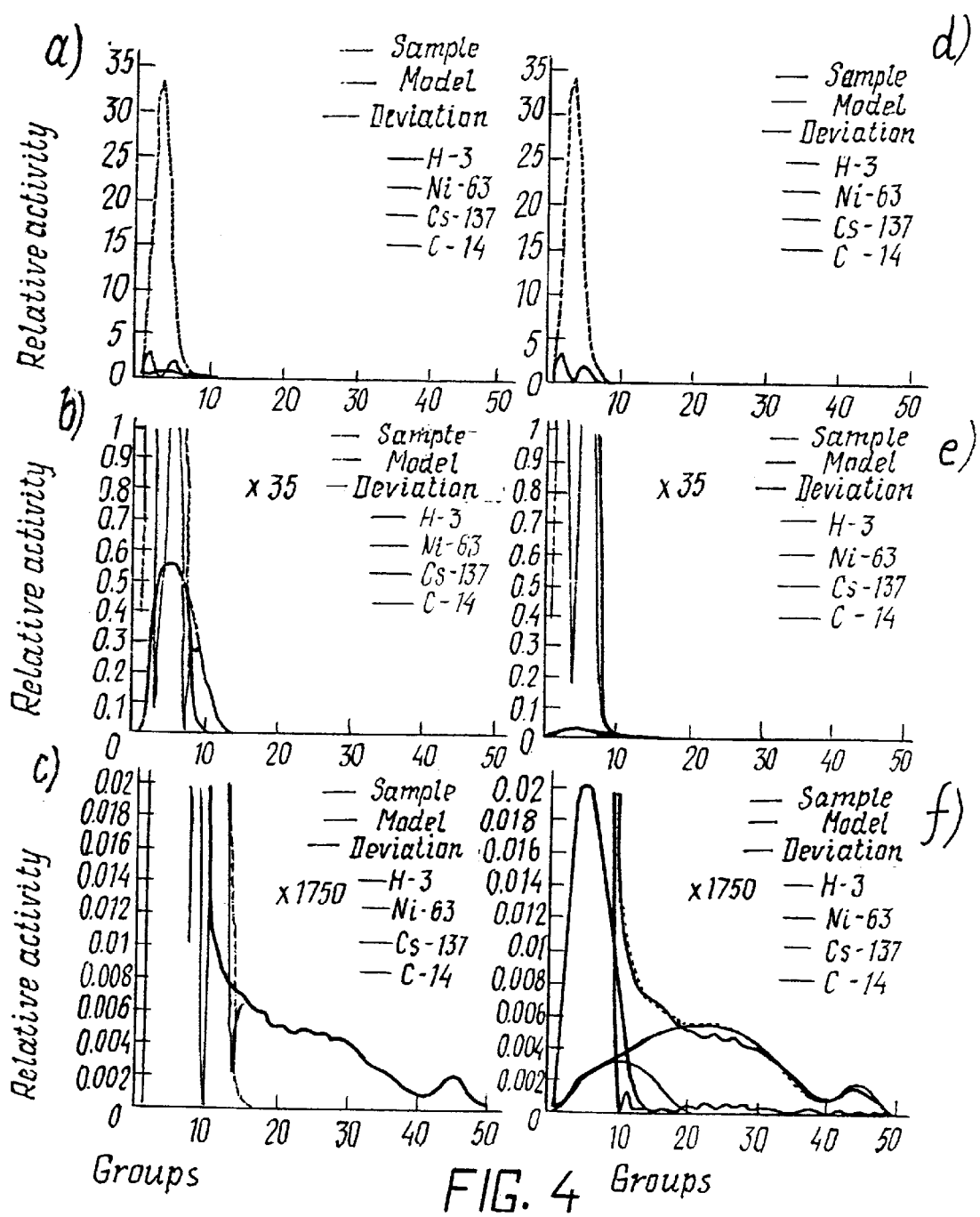
FIG. 4 shows the results of processing a test sample according to the prototype method and the proposed method.
Figure 5:
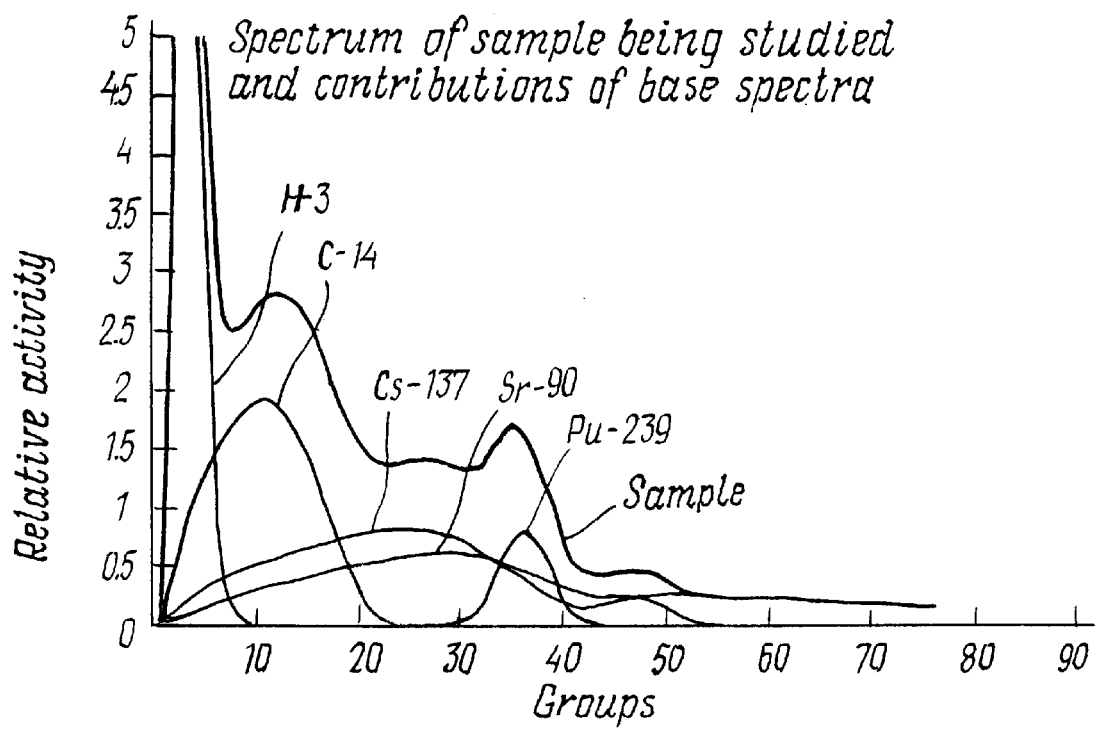
FIG. 5 shows a spectrum of a sample consisting of a mixture of alpha- and beta-emitting radionuclides.
Figure 6:
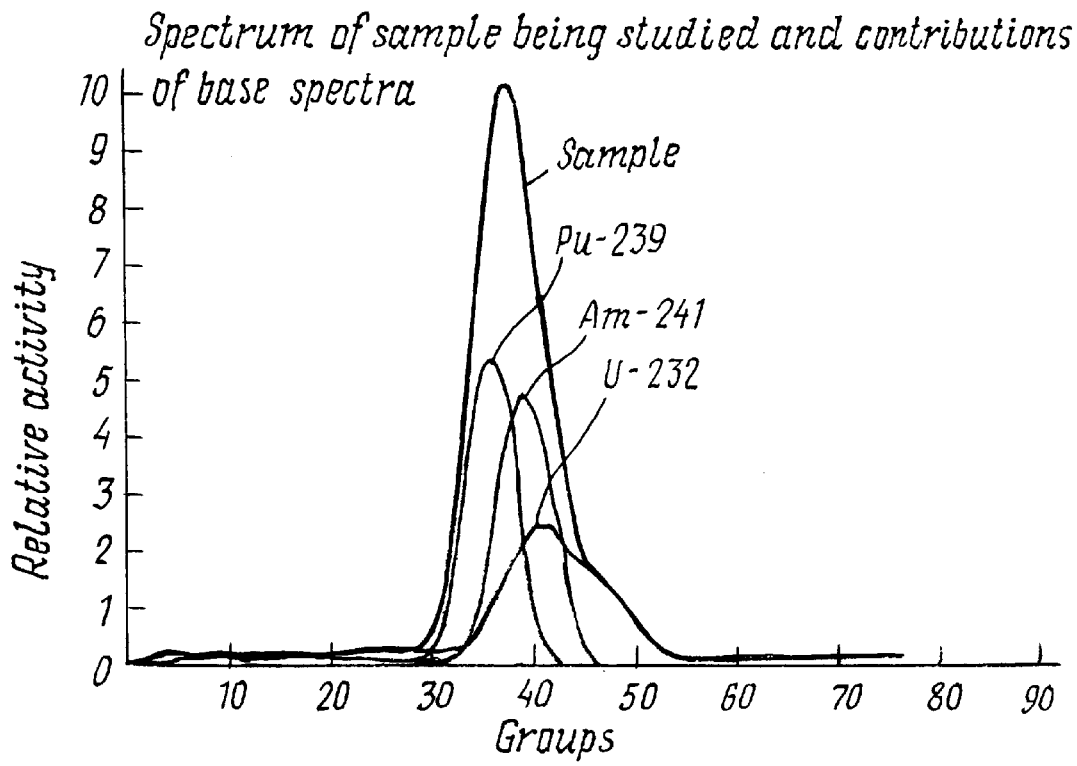
FIG. 6 shows a spectrum of a sample consisting of a mixture of alpha-emitting radionuclides.

The advantages of the claimed method are illustrated by the data presented in FIGS. 4–6 and in Tables 2–4.

The higher efficiency of the claimed method as compared with the methods known from prior art is in that this method makes it possible to distinguish radionuclides with low levels of activity on a background of radionuclides having high activity in samples by selecting a corresponding scale for grouping apparatus spectra and determining criteria for minimization of deviation of a sample spectrum from a model spectrum.

The real makeup of sample No. 1 and the results of determining the radionuclide makeup using the known method and the method corresponding to the invention are presented in Table 2.

TABLE 2

Sample No. 1, Quench = 354

| | | Activity of sample Bk | |
|---|---|---|---|
| Name of radionuclide | Makeup of test sample | Known method | Proposed method |
| H-3 | 30000 | 30041.1 | 31095.1 |
| C-14 | 5 | 0.0 | 3.5 |
| Ni-63 | 10 | 232.1 | 8.6 |
| Cs-137 | 10 | 0.0 | 11.3 |
| Total | 30025 | 30273.2 | 31118.5 |

It is evident from Table 2, that using the proposed method the whole radionuclide makeup in the sample is sufficiently accurately determined, while the known method made it possible to exactly determine only tritium, the activity of which is substantially higher than the activity of accompanying elements. The results of determination of the radionuclide makeup of sample No. 1 are well illustrated by the graphs in FIG. 4. The spectrum of the sample, model spectrum, contributions of spectra of separate radionuclides to the model spectrum and deviation of the model spectrum from the sample spectrum are shown in those graphs. In the upper one—the complete spectra, in the middle and bottom graphs—the lower part of the upper graph magnified respectively by 35 and 1750 times. The results corresponding to the known method are presented on the left graphs (FIGS. 4a, b, c), those corresponding to the claimed method are presented on the right graphs (FIGS. 4d, e, f). It is evident from the graphs that the model spectrum, obtained according to the known method only in the upper part, coincides with the sample spectrum, while the model spectrum obtained according to the claimed method is close to the sample spectrum over the whole range.

The apparatus spectrum of a sample consisting of a mixture of beta-active isotopes—H-3, C-14, Sr-90, Cs-137 with 5 Bk of each of the isotopes and 1 Bk of alplha-active Pu-239, and also the contributions of these isotopes, calculated according to the proposed method, are shown in FIG. 5. It is evident from FIG. 5 and Table 3, that the alpha-active radionuclide is sufficiently accurately determined on the background of the spectrum of a complex mixture of beta-active isotopes.

TABLE 3

| Radionuclide | Activity of sample, Bk |
|---|---|
| H-3 | 5.11 |
| C-14 | 5.05 |
| Sr-90 | 5.08 |
| Cs-137 | 5.06 |
| Pu-239 | 0.99 |

The apparatus spectrum of a sample consisting of a mixture of alpha-active isotopes—U-232, Pu-239, Am-241 with 5 Bk of each of the isotopes, and also the contributions of these isotopes calculated according to the proposed method are shown in FIG. 6. It is evident from FIG. 6 and Table 4 that the method makes it possible to sufficiently clearly separate the alpha-active radionuclides in their mixtures.

TABLE 4

| Radionuclide | Activity of sample, Bk |
|---|---|
| U-232 | 5.03 |
| Pu-239 | 5.02 |
| Am-241 | 5.10 |

EXAMPLE 1

An aqueous technological sample is taken from one of the burial sites of radioactive wastes in Russia. This sample has an activity of about $10^6$ Bk/l, due to the presence of a large amount of tritium, but it is necessary to determine other, weakly-active, radionuclides in the sample, which in respect to their radiation danger exceed tritium by several orders of magnitude.

This sample is prepared in the following manner. The pH of an aqueous sample is brought to the neutral value, the obtained solutions are put into flasks for liquid scintillation count, preliminarily filled with 10 ml of a scintillation cocktail. The obtained homogeneous solution is held in darkness for 12 hours to quench possible chemical luminescence and photoluminescence processes. Then the flasks are set in a liquid scintillation analyzer for measurement. The spectrum of the sample is measured and the measurement parameters recorded: time of measurement—60 mm, quench—270, specimen of sample—5 ml.

The following steps are taken to determine weakly active radionuclides on a background of highly active tritium.

The apparatus spectrum, terminating in the 1280th channel, is grouped, in accordance with relationship (2), into 70 groups with m=2.

A model spectrum in accordance with expression (3) is formed from the library of base spectra for the measured quench level. In order to do this, a set of radioisotopes is selected which are characteristic for this burial site. Then, setting $\delta=10$ and $c_j=0$ for all meanings of j, expression (4) is minimized.

Then $\delta$ is reduced 10 times and minimization is carried out again, using the meanings of $c_j$ obtained in the preceding step as the initial values of the contributions. The procedure is repeated until the process of minimization becomes unstable (a change of the contributions $c_j$ does not result in a reduction of the expression being minimized).

The thus obtained $c_j$ coefficients determine the relative contribution of radionuclides to the activity of the sample. A transition to absolute activity is carried out according to equation (5).

As a result of the conducted selection, sample preparation, measurement and processing of the sample spectra, the radionuclide makeup is identified and the activity of each radionuclide included in the makeup of the sample is defined.

The result of processing the sample is presented in Table 5.

TABLE 5

| Radionuclide | Activity of unevaporated sample, Bk | Activity of evaporated sample, Bk |
|---|---|---|
| H-3 | 32800.1 | 3.1 |
| C-14 | 1.1 | 1.4 |
| Na-22 | 2.6 | 2.1 |
| K-40 | 1.2 | 0.8 |
| Co-60 | 0 | 0 |
| Ni-63 | 0 | 0 |
| Sr-90 + Y-90 | 2.9 | 2.8 |
| Cs-137 | 0 | 0 |
| Total | 32807.9 | 10.2 |

Thus, the proposed method makes it possible to detect small additions of accompanying isotopes in water comprising a large amount of tritium. This result is confirmed (see Table 5) by a repeated processing after evaporation of the sample, wherewith the content of tritium is brought to a minimum.

EXAMPLE 2

A test sample of soil is prepared, which weighs 1 kg and contains a mixture of alpha-active isotopes—15 Bk U-232, 5 Bk Pu-236, 10 Bk Pu-239, 3 Bk Am-241, and interfering beta-active radionuclides—2 Bk H-3, 10 Bk C-14, 5 Bk Co-60, 35 Bk Cs-137. The sample is dried for 6–8 hours at a temperature of 60° C. in a drying cabinet, is ground in a porcelain mortar and is spread on a vibration table with a set of sieves of different diameter. The finest fraction (0.5 mm and less) is divided by the quartering method and a 10 g portion is taken for analysis.

It is annealed for 6 hours at a temperature of 450° C. After annealing, 3 g of the sample are taken and acidic breaking up is carried out using concentrated nitric acid and concentrated hydrogen peroxide. In order to do this the sample is heated on an electric plate for 1 hour with 40 ml of concentrated nitric acid and 2 ml of 30% hydrogen peroxide with periodic mixing in a heat resistant beaker covered with an hour glass. Then the mixture is filtered in a funnel with a "blue band" filter, the residue with the filter is put into the same beaker, the same volumes of nitric acid and hydrogen peroxide are put in, and the process is repeated. The residue on the filter is washed with 20 ml of 6 n nitric acid, all three acidic infusions are combined. The combined acidic fusion is evaporated to the state of moist salts.

After that 20 ml of hot distilled water are poured onto the moist nitric acid residue, the residue is dissolved and evaporated to the state of moist salts. A solution of hot hydrochloric acid in an amount of 20 ml is added to the residue until full dissolution of the residue and it is evaporated to the state of moist salts. Then 10 ml of hot distilled water is poured onto the residue and it is again evaporated to the state of moist salts. The residue is dissolved in 4 ml of hot hydrochloric acid. The obtained solution has an intensive yellow color. In order to reduce the degree of coloring of the solution, 2 ml of concentrated orthophosphoric acid are introduced into the cooled hydrochloric acid solution while mixing and then evaporated on an electric plate while periodically adding drop-by-drop 500 $\mu$l of 30% $H_2O_2$ and 20 ml of boiling distilled water until a colorless viscous mass with a 2 ml volume is formed. Then the solution is cooled to a temperature of about 30° C. and, while mixing, 1 ml of a freshly prepared, saturated solution of bivalent lead chloride is added.

The obtained solution is put into a measuring flask for LSC, the flask being preliminarily filled with 10 ml of an "Ultima Gold AB" scintillation cocktail, 1 ml of a "TRITON X-100" emulsifier is added, and it is all thoroughly mixed.

Then the quench of the prepared count sample is measured. The tSIE quench parameter in that case was equal to 300, there was no luminescence (Lum=0).

After that the obtained energetic spectrum of the sample is analyzed and the qualitative makeup of the sample and the volumetric activity of its components are determined.

A model spectrum according to equation (3) is formed from the library of base spectra for the measured quench level. In order to do this a set of radioisotopes is selected which are characteristic for this selection site. Here $c_j$ designates relative contributions to the model spectrum of the radionuclides, i is the group number, j is the radionuclide index. Then, setting $\delta=10$ and $c_j=0$ for all meanings of j, expression (4) is minimized.

Then $\delta$ is decreased by 10 times and minimization is carried out again, using the $c_j$ meanings obtained in the preceding step as the initial values of the contributions. This procedure is repeated until the process of minimization becomes unstable (a change of the contributions $c_j$ does not result in a reduction of the expression being minimized).

The coefficients $c_j$ thus obtained determine the relative contribution of radionuclides to the activity of the sample. A transition to absolute activity is carried out according to equation (5).

Figure 7:
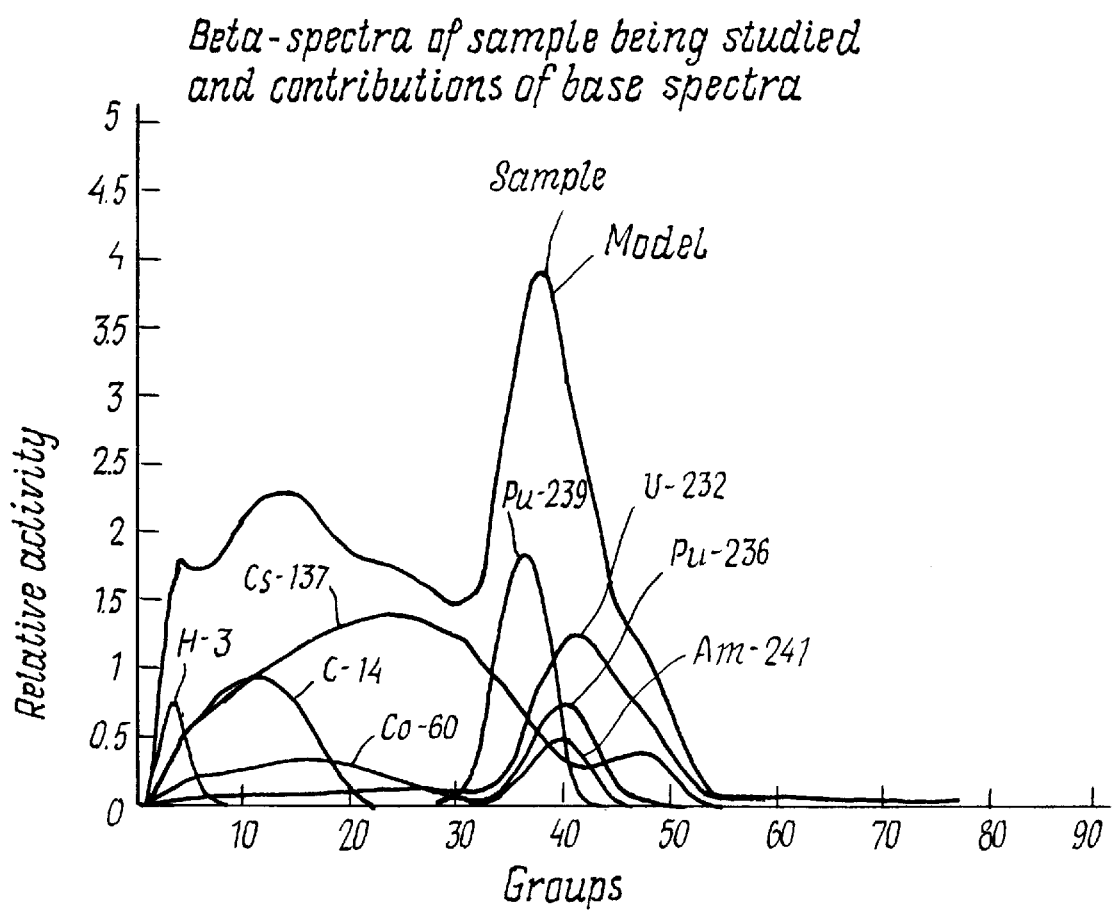
FIG. 7 shows an example of determining the radionuclide makeup of a sample consisting of a mixture of beta- and alpha-emitting isotopes.

It is seen from FIG. 7 that there is full coincidence of the spectrum of the sample with the calculated model spectrum, and the results of identification of the radioisotope makeup, completely agreeing with the initial makeup of the sample, are presented in Table 6.

TABLE 6

| Radionuclide | Activity of sample, Bk |
|---|---|
| H-3 | 2.0 |
| C-14 | 9.9 |
| Co-60 | 6.1 |
| Cs-137 | 35.4 |
| U-232 | 15.0 |
| Pu-236 | 5.2 |
| Pu-239 | 9.9 |
| Am-241 | 2.9 |

As a result of the conducted sample preparation, measurement and processing of the sample spectra, the radionuclide makeup is identified and the activity of each radionuclide included in the makeup of the sample is defined.

INDUSTRIAL APPLICABILITY

The claimed method, as compared with the known methods, makes it possible to increase the sensitivity of spectrometric analysis, to ensure the attainment of a sample with an acceptable degree of quench, which makes it possible to substantially increase the reliability of identification of the radionuclides in solid samples with use of liquid scintillation count, including the possibility for this method to separate and identify with sufficient accuracy alpha-active radionuclides on a background of interfering radionuclides.

The claimed method may be used in all fields where it is necessary to determine the content of radionuclides in different objects, including radio-ecological monitoring of the environment, monitoring the radiation situation at installations with increased danger of radiation, checking food products, monitoring medical research, etc.

What is claimed is:

1. A method for identifying radionuclides in samples with the use of a liquid scintillation counter, comprising selecting a sample of the environment or a technological sample, preparing the sample for measurement on a liquid scintillation counter, measuring and recording the spectrum of the sample, grouping the measured spectrum of the sample, creating a model spectrum on the basis of a library of base spectra of radionuclides, determining the content of radionuclides in the sample by minimizing the deviation of the model spectrum from the measured spectrum of the sample, characterized in that determination of the content of radionuclides in the sample by minimizing the deviation of the model spectrum from the measured spectrum is carried out according to the expression $$\sum_i \left(\frac{Pi - Mi}{\min(Pi, Mi + \delta)}\right)^2 \to \min,$$

where $P_i$ is the measured spectrum of the sample, $\delta$ is a coefficient, on the value of which the stability of the minimization process depends ($\delta > 0$), $$M_i = \sum_j c_j M_{ij}$$

i is the number of a group, j is the index of a radionuclide, $M_{ij}$ designates normalized spectra of separate radionuclides from the library of base spectra, $c_j$ designates relative contributions of base spectra of radionuclides to a model spectrum, by varying the values of these contributions $c_j$, after which the obtained values of relative contributions of base spectra of radionuclides $c_j$ are recalculated into values of absolute activities ($A_j$) of radionuclides in a sample according to the equation:

$$A_j = c_j * P / E_j$$

where $$P = \sum_i P_i$$

is the integral count of the sample, $E_j$ is the efficiency of registration for the j isotope.

2. A method according to claim 1, characterized in that when the measured spectrum of the sample is grouped, the boundary values of the groups $N_i$ are preferably determined in accordance with the recurrent relationship:

$$N_{i+1} = N_i + [(i+1)/m],$$

where i=1, 2, . . . , n, n is the number of groups, m is an integer depending on the number of channels of the amplitude analyzer of the liquid scintillation counter and on the necessary number of groups,

[(i+1)/m] is a sign for an integer part of the expression.

3. A method according to claim 2, characterized in that in the case of a solid sample, annealing of the sample is carried out when it is being prepared for measurement on a liquid scintillation counter in order to reduce the effects of luminescence and quenching, acidic breaking up is carried out with the aid of concentrated nitric acid and hydrogen peroxide, the sample is concentrated by evaporation to a state of moist salts, the moist residue is converted into a hydrochloride solution by adding a hot solution of hydrochloric acid and is concentrated by evaporation with the periodic addition, at least twice, of distilled water, then, after cooling to room temperature, concentrated orthophosphoric acid is added to the obtained concentrated solution, it is concentrated by evaporation with the periodic addition, at least twice, of concentrated hydrogen peroxide and hot distilled water to the formation of a colorless viscous solution which is a mixture of pyrophosphate complexes of cations of the main components of the solid sample, the solution is cooled to room temperature, a saturated solution of a bivalent lead chloride is added thereto and it is carried into a scintillation cocktail, adding an emulsifier, and the mixture is thoroughly mixed, obtaining a count sample prepared for spectrometric analysis.

4. A method according to claim 1 or claim 2, characterized in that minimization of the deviation of a model spectrum from the measured spectrum of a sample is carried out in several steps, wherein, in the initial step a value of $\delta$ not less than max $(P_i, M_i)$ for any i, and zero values of relative contributions of base spectra of radionuclides to the model spectrum $(c_j)$ are selected, varying the value of $c_j$, the minimum is found, and at each following step $\delta$ is reduced, repeating the process of minimization, wherein the results of calculation obtained at the preceding step are the initial meanings of the contributions $c_j$ for each following step of minimization.

5. A method according to claim 4, characterized in that determination of the content of radionuclides in a sample with use of step-by-step minimization of the deviation of a model spectrum from the measured spectrum of a sample is terminated when the process of minimization becomes unstable.

6. A method according to claim 5, characterized in that in the case of a solid sample, annealing of the sample is carried out when it is being prepared for measurement on a liquid scintillation counter in order to reduce the effects of luminescence and quenching, acidic breaking up is carried out with the aid of concentrated nitric acid and hydrogen peroxide, the sample is concentrated by evaporation to a state of moist salts, the moist residue is converted into a hydrochloride solution by adding a hot solution of hydrochloric acid and is concentrated by evaporation with the periodic addition, at least twice, of distilled water, then, after cooling to room temperature, concentrated orthophosphoric acid is added to the obtained concentrated solution, it is concentrated by evaporation with the periodic addition, at least twice, of concentrated hydrogen peroxide and hot distilled water to the formation of a colorless viscous solution which is a mixture of pyrophosphate complexes of cations of the main components of the solid sample, the solution is cooled to room temperature, a saturated solution of a bivalent lead chloride is added thereto and it is carried into a scintillation cocktail, adding an emulsifier, and the mixture is thoroughly mixed, obtaining a count sample prepared for spectrometric analysis.

7. A method according to claim 4, characterized in that in the case of a solid sample, annealing of the sample is carried out when it is being prepared for measurement on a liquid scintillation counter in order to reduce the effects of luminescence and quenching, acidic breaking up is carried out with the aid of concentrated nitric acid and hydrogen peroxide, the sample is concentrated by evaporation to a state of moist salts, the moist residue is converted into a hydrochloride solution by adding a hot solution of hydrochloric acid and is concentrated by evaporation with the periodic addition, at least twice, of distilled water, then, after cooling to room temperature, concentrated orthophosphoric acid is added to the obtained concentrated solution, it is concentrated by evaporation with the periodic addition, at least twice, of concentrated hydrogen peroxide and hot distilled water to the formation of a colorless viscous solution which is a mixture of pyrophosphate complexes of cations of the main components of the solid sample, the solution is cooled to room temperature, a saturated solution of a bivalent lead chloride is added thereto and it is carried into a scintillation cocktail, adding an emulsifier, and the mixture is thoroughly mixed, obtaining a count sample prepared for spectrometric analysis.

8. A method according to claim 1, characterized in that in the case of a solid sample, annealing of the sample is carried out when it is being prepared for measurement on a liquid scintillation counter in order to reduce the effects of luminescence and quenching, acidic breaking up is carried out with the aid of concentrated nitric acid and hydrogen peroxide, the sample is concentrated by evaporation to a state of moist salts, the moist residue is converted into a hydrochloride solution by adding a hot solution of hydrochloric acid and is concentrated by evaporation with the periodic addition, at least twice, of distilled water, then, after cooling to room temperature, concentrated orthophosphoric acid is added to the obtained concentrated solution, it is concentrated by evaporation with the periodic addition, at least twice, of concentrated hydrogen peroxide and hot distilled water to the formation of a colorless viscous solution which is a mixture of pyrophosphate complexes of cations of the main components of the solid sample, the solution is cooled to room temperature, a saturated solution of a bivalent lead chloride is added thereto and it is carried into a scintillation cocktail, adding an emulsifier, and the mixture is thoroughly mixed, obtaining a count sample prepared for spectrometric analysis.

* * * * *